(12) United States Patent
Ishii (10) Patent No.: US 8,018,986 B2
(45) Date of Patent: Sep. 13, 2011

(54) SIGNAL RECEIVING APPARATUS INCLUDING EQUALIZER, TERMINAL APPARATUS, SIGNAL RECEIVING METHOD, AND SIGNAL RECEIVING PROGRAM (75) Inventor: Daiji Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 721 days.

(21) Appl. No.: 12/089,129

(22) PCT Filed: Oct. 3, 2006

(86) PCT No.: PCT/JP2006/319760
§ 371 (c)(1),
(2), (4) Date: Apr. 3, 2008

(87) PCT Pub. No.: WO2007/040216
PCT Pub. Date: Apr. 12, 2007

(65) Prior Publication Data
US 2009/0041094 A1   Feb. 12, 2009

(30) Foreign Application Priority Data
Oct. 3, 2005 (JP) .................. 2005-290458

(51) Int. Cl.
*H04B 1/00* (2006.01)
(52) U.S. Cl. ....................... 375/148; 708/323
(58) Field of Classification Search .......... 375/148, 375/130, 147, 150, 229, 232, 316, 346, 347, 375/349; 455/114.3, 127, 103; 708/323
See application file for complete search history.

(56) References Cited

U.S. PATENT DOCUMENTS 5,598,428 A * 1/1997 Sato ............................. 375/148
6,141,337 A * 10/2000 Uta et al. ..................... 370/350

FOREIGN PATENT DOCUMENTS

| JP | 08046484 A | 2/1996 |
| JP | 2000101547 A | 4/2000 |
| JP | 2001358621 A | 12/2001 |
| JP | 2000278178 A | 10/2003 |
| JP | 2004040305 A | 2/2004 |
| JP | 2004505491 A | 2/2004 |
| JP | 2004356864 A | 12/2004 |
| JP | 2005094541 A | 4/2005 |
| JP | 2005175775 A | 6/2005 |

OTHER PUBLICATIONS

International Search Report for PCT/JP2006/319760, mailed Dec. 5, 2006.

* cited by examiner

*Primary Examiner* — Khai Tran (57) ABSTRACT

A signal receiving apparatus which can reduce a circuit scale to reduce a cost in a mobile wireless communication system which transmits and receives a spread spectrum signal is provided.
The signal receiving apparatus includes a filter coefficient updating unit 104 which generates a filter coefficient w on the basis of an input signal x, a transformational despreading unit 101 which performs a despreading process to the input signal x, and an FIR filter 103 which performs multiplication by using a despreading output z output from the transformational despreading unit and the filter coefficient w output from the filter coefficient updating unit 104 as inputs to output a result which the multiplication results are added as a signal data symbol output S. The transformational despreading unit 101 obtains a despreading output by addition and subtraction between the input signal x and a spread code sequence c.

10 Claims, 6 Drawing Sheets

SIGNAL RECEIVING APPARATUS INCLUDING EQUALIZER, TERMINAL APPARATUS, SIGNAL RECEIVING METHOD, AND SIGNAL RECEIVING PROGRAM

TECHNICAL FIELD

The present invention relates to a signal receiving apparatus, a terminal apparatus, a signal receiving method, and a signal receiving program which are preferably applied to a mobile wireless communication system using a spread spectrum technique.

BACKGROUND ART

In a mobile wireless communication system, in general, a radio wave from a base station reaches a mobile terminal apparatus (to be referred to as a terminal apparatus hereinafter) such as a mobile telephone through a plurality of paths. More specifically, a plurality of incoming waves are received by the terminal apparatus while being added to each other. At this time, by interference (multipath interference) of the plurality of incoming waves, a reception electric field intensity in the terminal apparatus varies with elapsed time. Furthermore, when the terminal apparatus moves, multipath aging in which the reception electric field intensity varies rapidly and intricately becomes conspicuous with the movement. A digital signal transmission characteristic is deteriorated due to the multipath aging.

In 3GPP (3rd Generation Partnership Project) which is an international standard specification association of a third generation mobile wireless communication method, a new communication technique called an HSDPA (High Speed Downlink Packet Access) which can perform high-speed wireless communication is added. When the HSDPA is used, a data transfer speed which is three or more times as fast as that obtained by using W-CDMA (Wideband Code Division Multiple Access) can be realized. However, when the HSDPA is operated in an actual environment, a high data transfer speed cannot be easily achieved by multipath interference.

Therefore, in order to compensate for signal deterioration in a transmission path to reproduce signal data, a circuit to remove influence of multipath interference must be mounted on a terminal apparatus. As such an example of the circuit, an equalizer is given (for example, see Patent Document 1).

Figure 1:
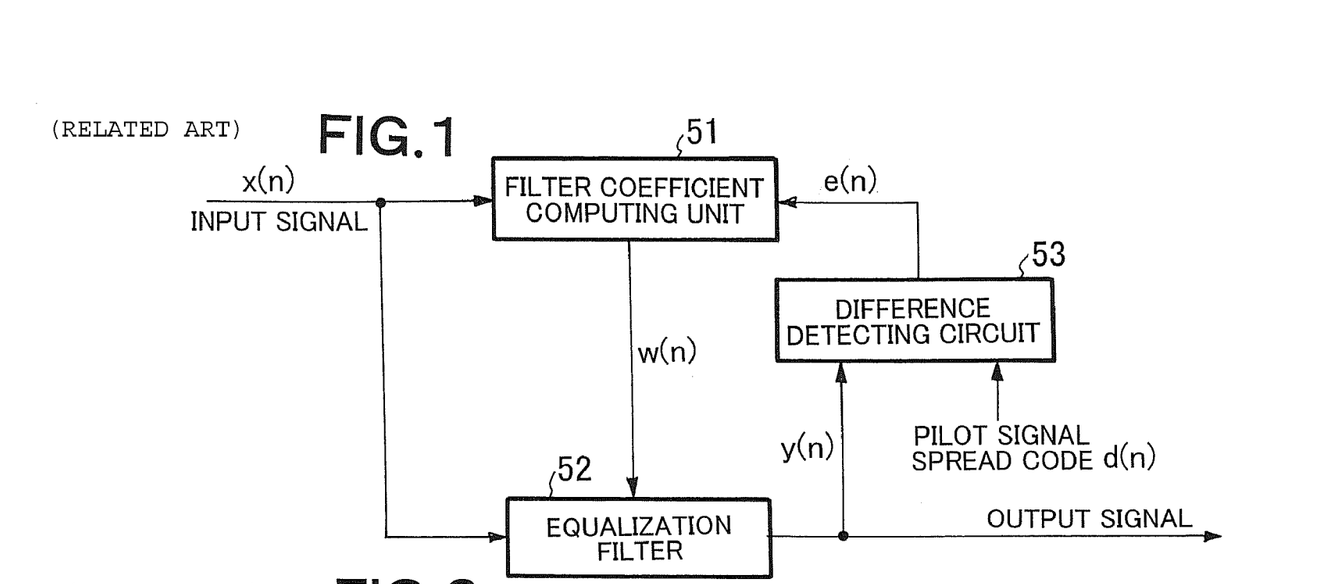
FIG. 1 is a block diagram showing a configuration of a conventional equalization apparatus.

FIG. 1 is a block diagram showing a configuration of the equalizer described in Patent Document 1. The equalizer shown in FIG. 1 is an equalizer using an NLMS (Normalized Least Mean Square) algorithm. In the equalizer shown in FIG. 1, an input signal x(n) is input to a filter coefficient computing unit 51 and an equalization filter 52. The input signal x(n) is, for example, a signal obtained by A-D converting a signal received through a wireless transmission path. An output from a difference detecting circuit 53 is also input to the filter coefficient computing unit 51. The difference detecting circuit 53 outputs a difference signal e(n) between an output signal y(n) from the equalization filter 52 and a spread code of a pilot channel (pilot signal spread code) d(n).

The filter coefficient computing unit 51 uses a filter coefficient (tap coefficient) w(n) before updating and the difference signal e (n) to perform an arithmetic operation expressed by the following equation so as to generate a new filter coefficient w(n+1). The filter coefficient w(n+1) is output to the equalization filter 52. Reference symbol "*" denotes multiplication.

$$w(n+1)=w(n)+\mu e(n)^*x(n)$$

where $\mu$ is a step size parameter, and is expressed by the following equation.

$$\mu=\alpha/(x(n)^H{}^*x(n)+\beta)$$

where $\beta$: stabilization parameter (parameter to preventing the denominator from being 0, and sufficiently small positive value)

$\alpha$: parameter to determine a convergence property of NLMS algorithm $x(n)^H$: transpose conjugate vector of x(n)

The equalization filter 52 has a part to which (f−1) delay units are continuously connected. The input signal x(n) is sequentially delayed by the (f−1) delay units. Furthermore, an input signal input to an input terminal (input terminal for an input signal) and an output (total of f data) from the (f−1) delay units are multiplied by a corresponding filter coefficient of f filter coefficients output from the filter coefficient computing unit 51. And f multiplication results are summed up to obtain an output signal y(n).

The equalization described in Patent Document 1 is constituted as described above, and operates as described above. In this manner, influence of multipath interference can be effectively removed. Patent Document 1 discloses that a despreading process for channel estimation is performed in the equalizer.

As a signal receiving apparatus in a mobile wireless communication system using a spread spectrum technique, a signal receiving apparatus in which a despreading circuit for performing a despreading process is connected to an output terminal of an equalizer and a signal receiving apparatus in which an equalizer is connected to an output of a despreading circuit are known (for example, see Patent Document 2).

Patent Document 1: JP-A 2005-175775 (Japanese Patent Laying-Open No. 2005-175775) (paragraph 0004, 0023, FIG. 1, FIG. 5)

Patent Document 2: JP-A 2004-40305 (Japanese Patent Laying-Open No. 2004-40305) (paragraph 0009, 0032, 0035, FIG. 10, FIG. 11)

DISCLOSURE OF THE INVENTION

Problem to be Solved by the Invention

Figure 2:
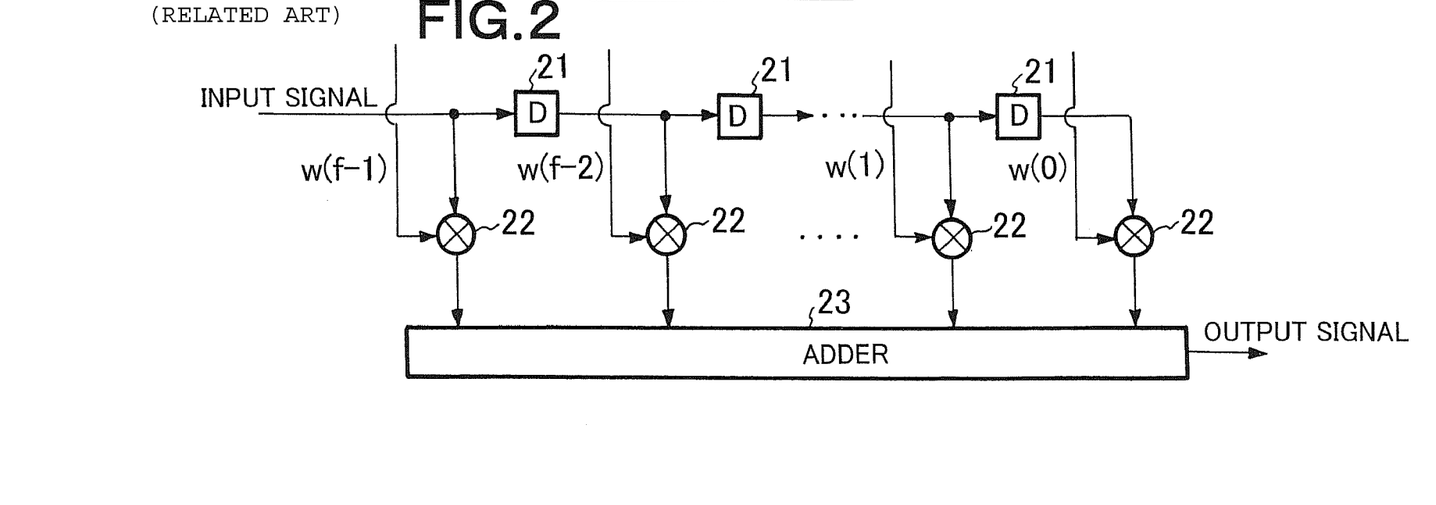
FIG. 2 is a block diagram showing a configuration of an equalization filter shown in FIG. 1.

FIG. 2 is a block diagram showing a configuration of an equalization filter described in Patent Document 1. In the configuration shown in FIG. 2, the equalization filter includes delay elements 21 which hold input signals x(n) at a plurality of times, respectively, multipliers 22 which multiply signals and the input signals x(n) at the times held by the delay elements 21 by a filter coefficient W(n), and an adder 23 which adds outputs from the multipliers 22 to generate an output signal.

The number of filter coefficients is generally on the order of 10 to 100. For this reason, in the equalization filter as shown in FIG. 2, the number of multipliers 22 is vast. The circuit scale of the multiplier 22 is larger than that of an adder/subtractor. Therefore, the circuit scale of the equalization filter is large. As a result, the cost of a signal receiving apparatus on which the equalization filter is mounted disadvantageously increases.

It is an object of the present invention to provide a signal receiving apparatus, a terminal apparatus, a signal receiving method, and a signal receiving program which can reduce a circuit scale to make the cost small in a mobile wireless communication system which transmits and receives a spread spectrum signal.

Means for Solving the Problem

A signal receiving apparatus according to the present invention includes a filter coefficient updating unit which generates a filter coefficient on the basis of the input signal, a transformational despreading unit which performs a despreading process to an input signal, and an equalization filter (for example, an FIR filter) which performs multiplication by using a despreading output from the transformational despreading unit and the filter coefficient output from the filter coefficient updating unit as inputs and outputs a result which the multiplication results are added as signal data (for example, an I signal and a Q signal in a primary modulation scheme), and in which the transformational despreading unit obtains a despreading output by addition and subtraction between the input signal and a spread code sequence.

EFFECT OF THE INVENTION

According to the present invention, since a configuration is designed to obtain a multiplication result by multiplying a despreading output by a filter coefficient without executing multiplication when a despreading output is obtained and to output a result which the multiplication results are added as signal data, the number of multipliers in the signal receiving apparatus can be reduced. In particular, the number of multipliers in an equalization filter can be reduced. As a result, the cost of the signal receiving apparatus can be reduced.

REFERENCE NUMERALS

101 Transformational despreading unit
102 Spread code generating unit
103 FIR filter
104 Filter count updating unit
101$a$ Computing unit
101$b$ Adder
101$c$ Delay element
103$a$ Multiplier
103$b$ Adder
103$c$ Register
201 Despreading unit
202 Spread code generating unit
203 FIR filter
204 Filter count updating unit
201$a$ Computing unit
201$b$ Adder
201$c$ Register
203$a$ Computing unit
203$b$ Adder
203$c$ Delay element

BEST MODE FOR CARRYING OUT THE INVENTION

A best mode of the present invention will be described below with reference to the drawings.

Embodiment 1

Figure 3:
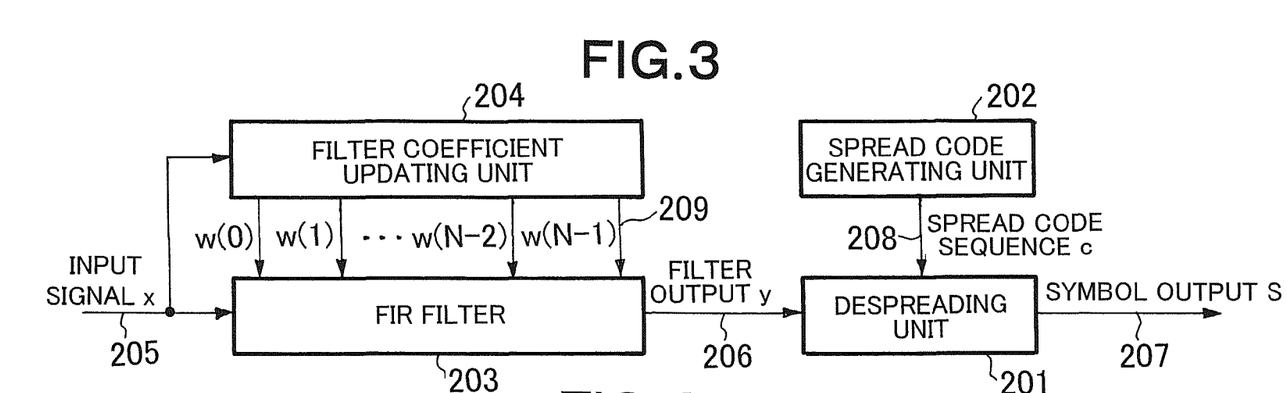
FIG. 3 is a block diagram showing a configuration of a first embodiment of a signal receiving apparatus according to the present invention.

FIG. 3 is a block diagram showing configuration examples of an equalizer and a despreading circuit in a signal receiving apparatus in which the despreading circuit is connected to an output of the equalizer. In the configuration shown in FIG. 3, the equalizer (equalization apparatus) includes a FIR (Finite Impulse Response) filter 203 which outputs a signal 206 (filter output y) obtained by removing multipath interference from an input signal 205 (input signal x) and a filter coefficient updating unit 204 which adaptively generates a filter coefficient 209 on the basis of the input signal 205. The input signal 205, for example, is a signal obtained by A-D converting a signal received through a wireless transmission path.

The despreading circuit includes a spread code generating unit 202 which outputs a spread code sequence 208 (spread code sequence c) and a despreading unit 201 which outputs a symbol output 207 (symbol output S) on the basis of the filter output y and the spread code sequence c.

Figure 4:
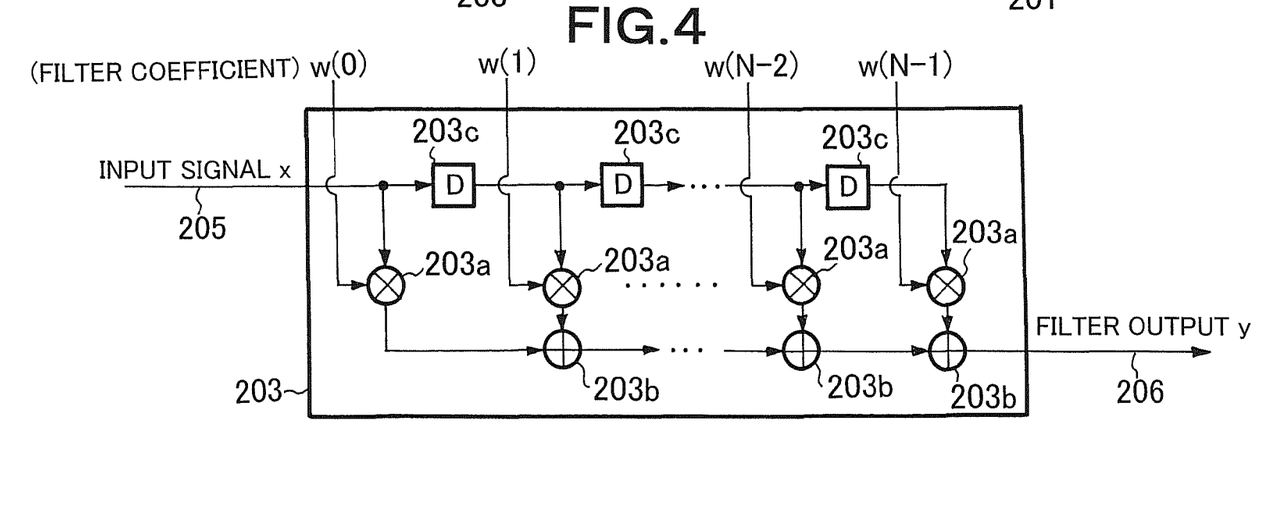
FIG. 4 is a block diagram showing a configuration example of an FIR filter according to the first embodiment.

The FIR filter 203 is constituted as shown in, for example, FIG. 4. The FIR filter 203 shown in FIG. 4 includes delay elements 203$c$ which hold input signals x at a plurality of times, respectively, multipliers 203$a$ which multiply the signals and the input signals x at the times held by the delay elements 203$c$ by a filter coefficient 209, and an adder 203$b$ which adds outputs from the multipliers 203$a$ to generate the filter output y. The input signal x, the filter output y, and the filter coefficient w are complex numbers. The FIR filter 203 shown in FIG. 4 fulfills the same role as that of the equalization filter shown in FIG. 2.

The despreading unit circuit despreads the filter output y from which multipath interference is removed by the equalizer to restore the transmitted data. The despreading is an inverted process of spreading executed on the transmission side. As shown in FIG. 3, the despreading unit circuit includes the spread code generating unit 202 which generates a spread code sequence c and the despreading unit 201 which outputs a symbol output S by using the spread code sequence c and the filter output y. The spread code sequence c and the symbol output S are complex numbers.

Figure 5:
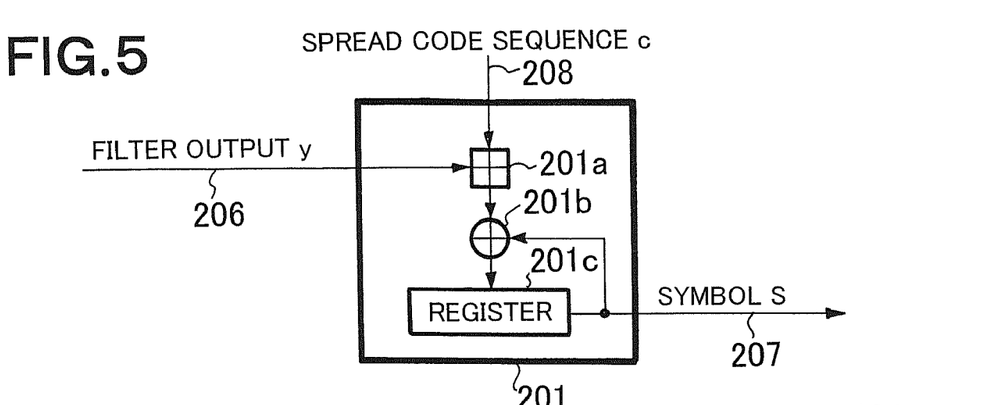
FIG. 5 is a block diagram showing a configuration example of a despreading unit according to the first embodiment.

The despreading unit 201, for example, as shown in FIG. 5, includes a computing unit 201$a$ which multiplies the filter output y by the spread code sequence c, an adder 201$b$ which accumulatively adds an output of the computing unit 201$a$ to a value held in a register 201$c$, and the register 201$c$.

When the filter output y is expressed by $y=y\_i+j*y\_q$ and the spread code sequence c is expressed by $c=c\_i+j*c\_q$, an output $p=p\_i+j*p\_q$ from the computing unit 201a is given by $p=c*y$.

Reference symbol "j" denotes an imaginary unit. In the above equations which express the filter output y, the spread code sequence c, and the output from the computing unit 201a, a forward part of a positive sign expresses a real part, and a backward part expresses an imaginary part.

Since $p=c*y$ is $p=(c\_i+j*c\_q)*(y\_i+j*y\_q)$ $=(c\_i*y\_i-c\_q*y\_q)+j*(c\_i*y\_q+c\_q*y\_i),$ $p\_i=c\_i*y\_i-c\_q*y\_q$ and $p\_q=c\_i*y\_q+c\_q*y\_i$ are satisfied.

On a transmission side of a spread spectrum signal, after data is primarily modulated by PSK (Phase Shift Keying) modulation or the like, spread modulation serving as secondary modulation is performed by the spread code. As a result of the spread modulation, a spread spectrum signal is generated. When an I (In-Phase) signal and a Q (Quadrature) signal which are primarily modulated are expressed by ±1, respectively, a real part and an imaginary part of a spread code in the spread code sequence c are +1 or −1, respectively. Therefore, $p\_i$ and $p\_q$ are given by the following equations (1):

$p\_i=y\_i-y\_q$ (when $c\_i=+1$, and $c\_q=+1$), $y\_i+y\_q$ (when $c\_i=+1$, and $c\_q=-1$), $-y\_i-y\_q$ (when $c\_i=-1$, and $c\_q=+1$), $-y\_i+y\_q$ (when $c\_i=-1$, and $c\_q=-1$), $p\_q=y\_i+y\_q$ (when $c\_i=+1$, and $c\_q=+1$), $-y\_i+y\_q$ (when $c\_i=+1$, and $c\_q=-1$), $y\_i-y\_q$ (when $c\_i=-1$, and $c\_q=+1$), $-y\_i-y\_q$ (when $c\_i=-1$, and $c\_q=-1$) (1)

More specifically, the arithmetic operation performed by the computing unit 201a is addition and subtraction the codes of which are determined depending on the positive and negative of the spread code sequence c.

Therefore, in the embodiment, as the computing unit 201a in the despreading unit 201, an adder/subtractor is used. Therefore, in comparison with a case in which a multiplier is used as the computing unit 201a, a circuit scale of the signal receiving apparatus including the equalizer can be reduced.

This embodiment describes a signal receiving apparatus which compensates for signal deterioration in a transmission path for transmitting an input signal which is spread-modulated to reproduce signal data from the input signal, including an equalization filter which performs an arithmetic operation by using an input signal and a filter coefficient output from a filter coefficient updating unit as inputs and outputs an arithmetic operation result as a filter output, and a despreading unit which performs a despreading process to the filter output, and characterized in that the despreading unit executes a despreading process by addition and subtraction (without performing multiplication).

Embodiment 2

In signals shown in FIG. 3, when an input signal x, a filter output y, a symbol output S, a spread code sequence c, and a filter coefficient w are represented by $x(\bullet)$, $y(\bullet)$, $S(\bullet)$, $c(\bullet)$, and $w(\bullet)$, respectively, the symbol output S and the filter output y are expressed by Equation (2) and Equation (3), respectively. The "$\bullet$" means an arbitrary parameter.

[Numerical Expression 1]

$$S(k) = \sum_{m=0}^{M-1} c(M*k+m)^* y(M*k+m) \qquad (2)$$

[Numerical Expression 2]

$$y(l) = \sum_{n=0}^{N-1} W(n)^* x(l-n) \qquad (3)$$

In Equation (2) and Equation (3), reference symbols M and N denote a spread rate and the number of filter coefficients, respectively. The S(k) denotes a kth symbol output S, the y(1) denotes a filter output y at time 1, the c(m) denotes an mth spread code (+1 or −1) in the spread code sequence c, and the w(n) denotes an nth coefficient in the filter coefficient w.

According to Equation (3), multiplication must be executed N times to obtain one filter output $y(\bullet)$. Furthermore, according to Equation (2), in order to obtain one symbol output $S(\bullet)$, multiplication must be executed with respect to M filter outputs $y(\bullet)$. Therefore, multiplication must be executed M*N times per one symbol output $S(\bullet)$.

When Equation (3) is assigned to Equation (2) to transform the equation, Equation (4) and Equation (5) are obtained.

[Numerical Expression 3]

$$S(k) = \sum_{m=0}^{M-1} c(M*k+m)^* \left\{ \sum_{n=0}^{N-1} w(n)^* x(M*k+m-n) \right\} \qquad (4)$$

$$= \sum_{n=0}^{N-1} w(n)^* \left\{ \sum_{m=0}^{M-1} c(M*k+m)^* x(M*k+m-n) \right\}$$

$$= \sum_{n=0}^{N-1} w(n)^* z(k,n)$$

[Numerical Expression 4]

$$z(k,n) = \sum_{m=0}^{M-1} c(M*k+m)^* x(M*k+m-n) \qquad (5)$$

The $c(\bullet)*x(\bullet)$ in Equation (5) has the same format as that of $p=c*y$ executed by the computing unit 201a shown in FIG. 5. A real part and an imaginary part of each spread code included in the spread code sequence 208 are +1 or −1 each. Therefore, the computing unit 201a can execute addition and subtraction as expressed by Equation (1) without executing multiplication when an arithmetic operation of $p=c*y$ is performed. A real part and an imaginary part of each spread code included in a spread code sequence 108 (spread code sequence c) are also +1 or −1 each. Therefore, an arithmetic operation of the right-hand side of Equation (5) can be realized by addition and subtraction as in the arithmetic operation performed by the computing unit 201a. Therefore, when an arithmetic operation of Equation (4) to generate a symbol output S(k) is executed, the number of times of multiplication may be N.

In the embodiment, the signal receiving apparatus executes the arithmetic operation of Equation (4) to reduce the number of times of multiplication. More specifically, the number of multiplier is reduced.

Figure 6:
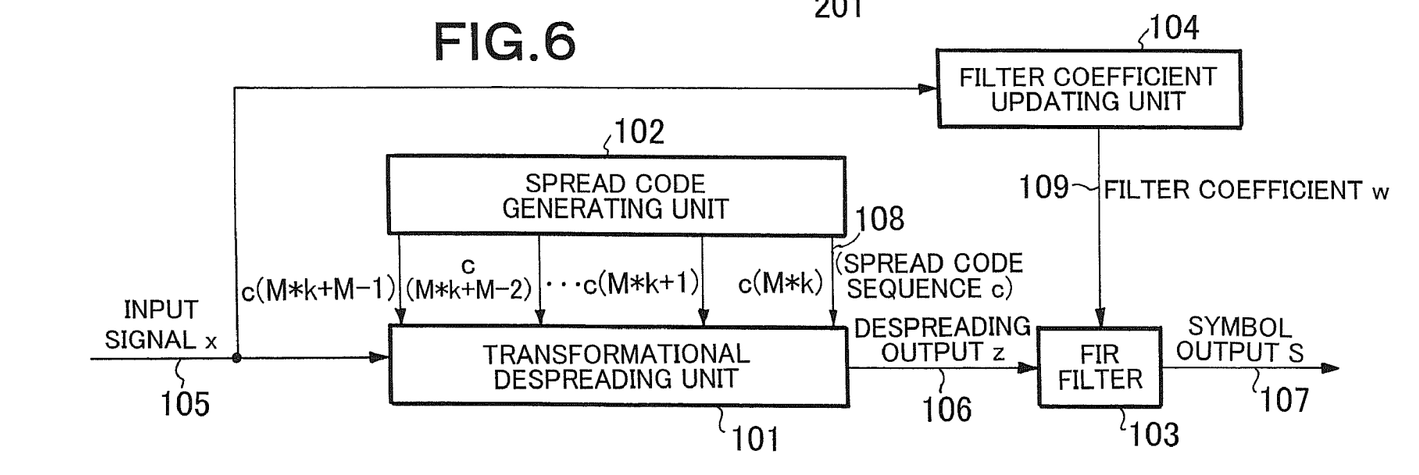
FIG. 6 is a block diagram showing a configuration of a second embodiment of a signal receiving apparatus according to the present invention.

FIG. 6 is a block diagram showing configuration examples of an equalizer and a despreading circuit in a signal receiving apparatus in which the equalizer (equalization apparatus) is connected to an output of the despreading circuit. In the configurations shown in FIG. 6, the despreading circuit includes a spread code generating unit 102 which outputs a spread code sequence c (spread code sequence 108) and a transformational despreading unit 101 which generates a despreading output z (despreading output 106) on the basis of an input signal x (input signal 105) and the spread code sequence c.

The equalizer includes an FIR filter 103 which outputs a filter output obtained by removing multipath interference from the despreading output z, namely, a symbol output S (symbol output 107) and a filter coefficient updating unit 104 which adaptively generates a filter coefficient w (filter coefficient 109) on the basis of the input signal x. The input signal 105 is, for example, a signal obtained by A-D converting a signal received through a wireless transmission path.

The transformational despreading unit 101 performs an arithmetic operation according to Equation (5). More specifically, the transformational despreading unit 101 inputs the input signal x (input signal 105) and the spread code sequence c (spread code sequence 108) output from the spread code generating unit 102, performs an arithmetic operation according to Equation (5), and outputs an arithmetic operation result as the despreading output z (despreading output 106).

The function of the spread code generating unit 102 is the same as the function of the spread code generating unit 202 shown in FIG. 3.

The spread code sequence c generated by the spread code generating unit 102 is the same sequence as the spread code sequence used when the transmission side executes spread modulation.

The FIR filter 103 performs the arithmetic operation of Equation (4). More specifically, the FIR filter 103 uses the despreading output z and the filter coefficient w output from the filter coefficient updating unit 104 as inputs, generates the symbol output S on the basis of the despreading output z and the filter coefficient w, and outputs the symbol output S.

The filter coefficient updating unit 104 adaptively generates the filter coefficient w to remove an influence of multipath interference by using the input signal x. The filter coefficient updating unit 104 outputs the filter coefficient w to the FIR filter 103. The function of the filter coefficient updating unit 104 is the same as that of the filter coefficient updating unit 204 shown in FIG. 3.

In the embodiment, a concrete configuration of the filter coefficient updating unit 104 is not restricted. For example, a filter coefficient computing unit 51 based on an NLMS algorithm as expressed in Patent Document 1 can be used as the filter coefficient updating unit 104. A known filter coefficient updating unit such as a filter coefficient updating unit based on an LMS (Least Mean Square) algorithm can be used.

The input signal x, the despreading output z, the symbol output S, the despread code sequence c, and the filter coefficient w are complex numbers.

Figure 7:
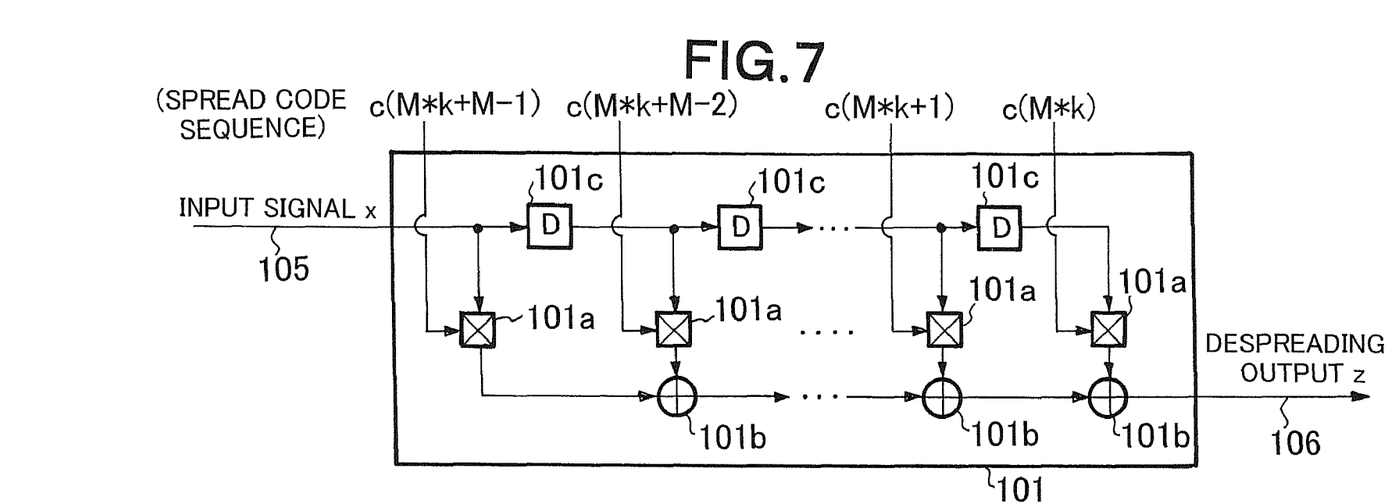
FIG. 7 is a block diagram showing a configuration example of a transformational despreading unit according to the second embodiment.

The transformational despreading unit 101 is constituted as shown in, for example, FIG. 7. In the transformational despreading unit 101 shown in FIG. 7, a delay element 101c holds input signals 105 at a plurality of times. Blocks in the equalizer and the despreading circuit operate in synchronism with a clock signal. Each of the delay element 101c latches the input signal x input to an input terminal (input terminal of the input signal x) or the input signal x held by the previous delay element 101c by a clock signal.

Each computing units 101a performs arithmetic operations with respect to the input signals x at times held in the delay elements 101c, the spread code sequence c, and 0 to M−1 in Equation (5), respectively. Since a real part and an imaginary part of each of the spread codes included in the spread code sequence c(•) are +1 or −1 each, each of the computing units 101a actually performs addition and subtraction but multiplication to make it possible to obtain an arithmetic operation result. Each of the computing units 101a may perform only addition and subtraction like each of the computing units 201a which is shown in FIG. 5 and which may perform addition and subtraction. An adder 101b adds outputs from the computing units 101a to each other to generate the despreading output z.

Figure 8:
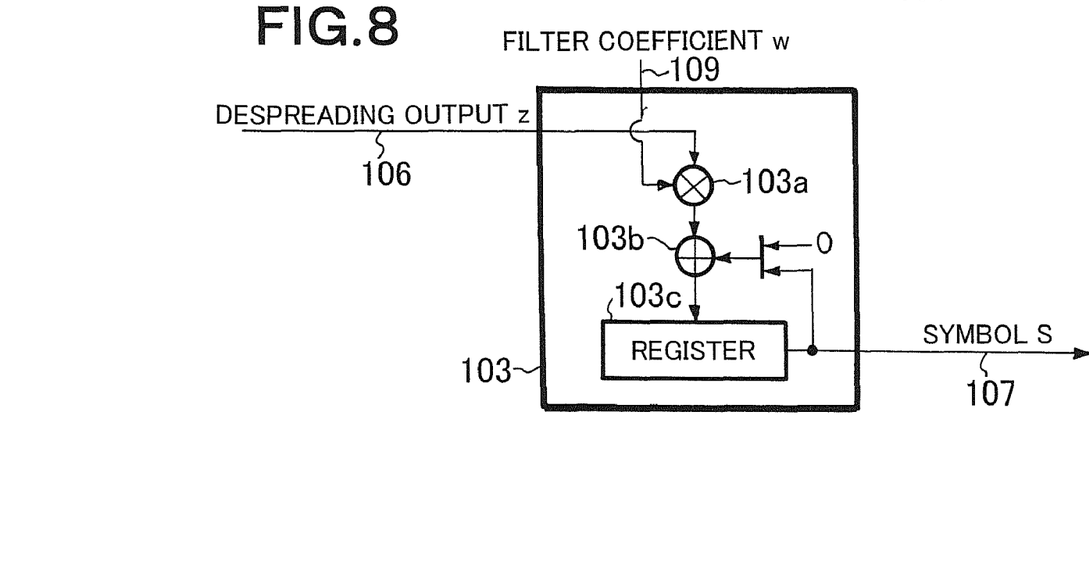
FIG. 8 is a block diagram showing a FIR filter configuration example of the second embodiment.

The FIR filter 103 is constituted as shown in, for example, FIG. 8. In the FIR filter 103 shown in FIG. 8, the multiplier 103a multiplies the despreading output z by the filter coefficient w.

An adder 103b adds an output from the multiplier 103a to a value held in a register 103c. However, at one time of the number of times N of addition, an output from the multiplier 103a is added to an initial value "0" but the value held in the register 103c. More specifically, when no value is held in the register 103c at all, and in the first adding process after the adding process is performed N times, "0" is added to an output from the multiplier 103a.

The register 103c holds an output from the adder 103b. The output from the register 103c is input to the adder 103b. When the adding process is performed N times in the adder 103b, the output from the register 103c is output as the symbol output S.

An operation of the signal receiving apparatus shown in FIG. 6 will be described below. In this case, an operation performed when the symbol output S (symbol output S(2)) of k=2 is output will be described below by using M=4 and N=3 as examples. More specifically, the transformational despreading unit 101 in which (M−1)=3 delay elements 101c are arranged, M=4 computing units 101a are arranged, and (M−1)=3 adders 101b are arranged will be exemplified.

[First Cycle]

In the transformational despreading unit 101, when the input signal x (input signal x(9)) is input, an arithmetic operation of Equation (5) when n=2 is performed. More specifically, an arithmetic operation of the following Equation (6) is performed.

[Numerical Expression 5]

$$z(2, 2) = \sum_{m=0}^{3} c(8+m)^* x(6+m) \qquad (6)$$
$$= c(8)^* x(6) + c(9)^* x(7) + c(10)^* x(8) + c(11)^* x(9)$$

In Equation (6), x(6) to x(8) are held in the delay element 101c. The c(•)*x(•) is calculated by each of the computing units 101a. Addition of the outputs from the computing units 101a is executed by each of the adders 101b.

For example, when the input signals x(6) to x(8) are held in the corresponding delay element 101c, the three computing units 101a except for the first computing unit 101a (computing unit 101a located at a position closest to the input terminal) perform arithmetic operations with respect to the input signals x(6) to x(8) held in the delay element 101c and corresponding filter coefficients c(8) to c(10). When the input signal x(9) is input to the input terminal, the first computing unit 101*a* performs an arithmetic operation of the input signal x(9) and the corresponding filter coefficient c(11). As described above, the arithmetic operation is addition and subtraction. The first adder 101*b* (adder 101*b* located at a position closest to the input terminal) adds an output from the first computing unit 101*a* and an output from the next computing unit 101*a*. Each of the other adders 101*b* adds an output from the previous adder 101*b* and an output from the corresponding computing unit 101*a*. The final adder 101*b* outputs an addition result as a despreading output z(2,2).

In the FIR filter 103, the multiplier 103*a* arithmetically operates w(2)*z(2,2) when n=2 in Equation (4). The adder 103*b* adds a value 0 serving as an initial value to an arithmetic operation result of the multiplier 103*a*. The addition result is expressed by Equation (7). An addition result T1 is held in the register 103*c*.

$$T1 = 0 + w(2)^* z(2,2) \quad (7)$$

[Second Cycle]

In the transformational despreading unit 101, when the input signal x (input signal x(10)) is input, Equation (5) when n=1 is arithmetically operated. More specifically, an arithmetic operation of the following Equation (8) is performed.

[Numerical Expression 6]

$$z(2,1) = \sum_{m=0}^{3} c(8+m)^* x(7+m) \quad (8)$$
$$= c(8)^* x(7) + c(9)^* x(8) + c(10)^* x(9) + c(11)^* x(10)$$

In Equation (8), x(7) to x(9) are held in the delay element 101*c*. The c(•)*x(•) are arithmetically operated by the computing units 101*a*, respectively. Addition of outputs from the computing units 101*a* is executed by each of the adders 101*b*.

For example, when the input signals x(7) to x(9) are held in the corresponding delay element 101*c*, the three computing units 101*a* except for the first computing unit 101*a* perform arithmetic operations with respect to the input signals x(7) to x(9) held in the delay element 101*c* and corresponding filter coefficients c(8) to c(10). When the input signal x(10) is input to the input terminal, the first computing unit 101*a* performs an arithmetic operation of the input signal x(10) and the corresponding filter coefficient c(11). As described above, the arithmetic operation is addition and subtraction. The first adder 101*b* adds an output from the first computing unit 101*a* and an output from the next computing unit 101*a*. Each of the other adders 101*b* adds an output from the previous adder 101*b* and an output from the corresponding computing unit 101*a*. The final adder 101*b* outputs an addition result as a despreading output z(2,1).

In the FIR filter 103, the multiplier 103*a* arithmetically operates w(1)*z(2,1) when n=1 in Equation (5). The adder 103*b* adds a value T1 held in the register 103*c* to an arithmetic operation result of the multiplier 103*a*. The addition result is expressed by Equation (9). An addition result T2 is held in the register 103*c*.

$$T2 = T1 + w(1)^* z(2,1) \quad (9)$$

[Third Cycle]

In the transformational despreading unit 101, when the input signal x (input signal x(11)) is input, Equation (5) when n=0 is arithmetically operated. More specifically, an arithmetic operation of the following Equation (10) is performed.

[Numerical Expression 7]

$$z(2,0) = \sum_{m=0}^{3} c(8+m)^* x(8+m) \quad (10)$$
$$= c(8)^* x(8) + c(9)^* x(9) + c(10)^* x(10) + c(11)^* x(11)$$

In Equation (10), x(8) to x(10) are held in the delay element 101*c*. The c(•)*x(•) are arithmetically operated by the computing units 101*a*, respectively. Addition of outputs from the computing units 101*a* is executed by each of the adders 101*b*.

For example, when the input signals x(8) to x(10) are held in the corresponding delay element 101*c*, the three computing units 101*a* except for the first computing unit 101*a* perform arithmetic operations with respect to the input signals x(8) to x(10) held in the delay element 101*c* and corresponding filter coefficients c(8) to c(10). When the input signal x(11) is input to the input terminal, the first computing unit 101*a* performs an arithmetic operation of the input signal x(11) and the corresponding filter coefficient c(11). As described above, the arithmetic operation is addition and subtraction. The first adder 101*b* adds an output from the first computing unit 101*a* and an output from the next computing unit 101*a*. Each of the other adders 101*b* adds an output from the previous adder 101*b* and an output from the corresponding computing unit 101*a*. The final adder 101*b* outputs an addition result as a despreading output z(2,0).

In the FIR filter 103, the multiplier 103*a* arithmetically operates w(0)*z(2,0) when n=0 in Equation (5). The adder 103*b* adds a value T2 held in the register 103*c* to an arithmetic operation result of the multiplier 103*a*. The addition result is expressed by Equation (11). An addition result T3 is held in the register 103*c*.

$$T3 = T2 + w(0)^* z(2,0) \quad (11)$$

[Fourth Cycle]

The value T3 held in the register 103*c* is output as the symbol output S (symbol output S(2)).

In the embodiment, after the transformational despreading unit 101 performs the arithmetic operation of Equation (5), the FIR filter 103 performs the arithmetic operation of Equation (4) by using the despreading output z obtained as a result of the arithmetic operation by the transformational despreading unit 101. As a result, the signal receiving apparatus according to the first embodiment requires multiplication M*N times. However, the number of times of multiplication can be reduced from M*N to N. This is because the computing unit 101*a* in the transformational despreading unit 101 actually performs addition and subtraction. When attention is given to the FIR filter, although N multipliers are required in the first embodiment, the number of multipliers can be reduced to one.

In the second embodiment, a plurality of adders 101*b* which add arithmetic operation results of the plurality of computing units 101*a* are arranged. However, one adder which adds the all arithmetic operation results of the plurality of computing units 101*a* may be arranged.

The second embodiment has been described with reference to the case in which k=2. However, even though k is another value, the second embodiment is effected. The second embodiment has been described with reference to the case in which M=4 and N=3. However, even though M and N are other values, the second embodiment is effected.

Embodiment 3

Figure 9:
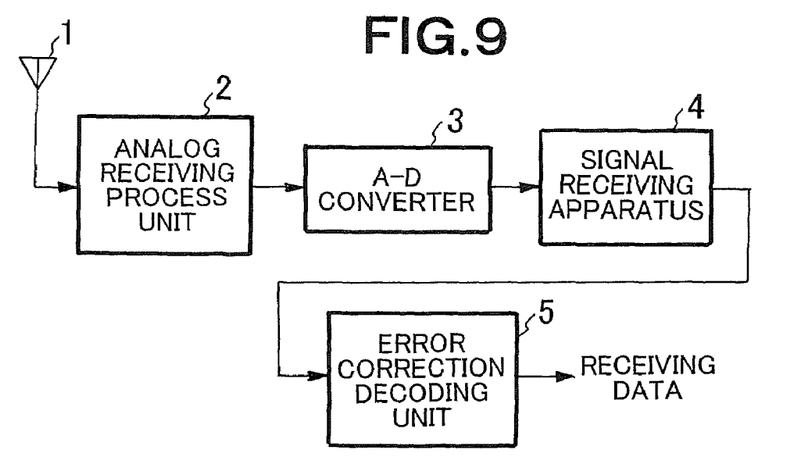
FIG. 9 is a block diagram showing a part of a configuration of a receiving unit of a terminal apparatus on which a signal receiving apparatus is mounted.

FIG. 9 is a block diagram showing a part of a configuration of a receiving unit of a terminal apparatus in which a signal receiving apparatus 4 according to the first embodiment or the second embodiment is mounted. The terminal apparatus shown in FIG. 9 is, for example, a mobile telephone.

When the terminal apparatus is a mobile telephone, in the configuration shown in FIG. 9, an antenna 1 receives a radio wave from a base station and outputs a high-frequency signal to an analog receiving process unit 2. The analog receiving process unit 2 performs processing such as frequency conversion to the high-frequency signal, and outputs the processed analog signal to an A-D converter 3. The A-D converter 3 converts the analog signal into a digital signal and outputs the digital signal to a signal receiving apparatus 4. The signal receiving apparatus 4 performs the processing described in the first embodiment and the second embodiment to a digital signal output from the A-D converter 3 as an input signal x. A symbol S is output to an error correction decode unit 5.

When a mobile wireless communication system is a system realized by CDMA or W-CDMA, the symbol S is, for example, an I signal and a Q signal in a QPSK modulation scheme. When the mobile wireless communication system is a system realized by HSDPA, the symbol S is an I signal and a Q signal in a 16 QAM modulation scheme or a QPSK modulation scheme.

The error correction decode unit 5 restores unmodulated data from the I signal and the Q signal in a predetermined modulation scheme and performs an error correction decode process to restore data transmitted by a base station.

Since the terminal apparatus as shown in FIG. 9 includes the signal receiving apparatus 4 according to the first embodiment or the second embodiment, the number of multipliers required for signal reception can be reduced. As a result, the cost of the terminal apparatus is reduced.

The example in which the signal receiving apparatus 4 is mounted on the terminal apparatus is described above. However, the signal receiving apparatus 4 may also be mounted on a base station which receives a signal from the terminal apparatus. In this case, a communication technique called HSUPA (High Speed Uplink Packet Access) is used.

Embodiment 4

Figure 10:
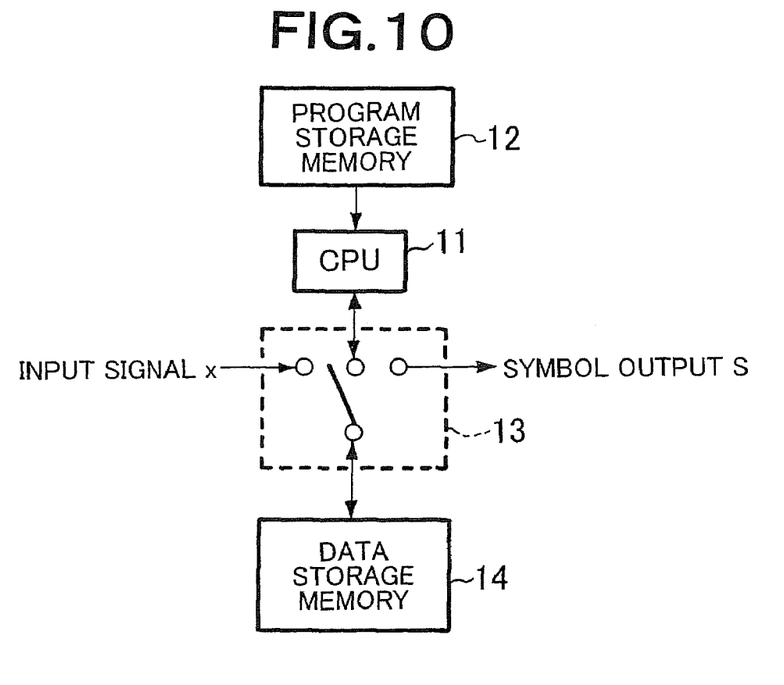
FIG. 10 is a block diagram showing an example of a circuit configuration of a signal receiving apparatus when the signal receiving apparatus is realized by software.

In each of the embodiments, it is assumed that the signal receiving apparatus is constituted by a hardware circuit. However, the signal receiving apparatus can also be realized by a CPU which operates according to a program. More specifically, the signal receiving apparatus can also be realized by software. FIG. 10 is a block diagram showing an example of a circuit configuration of a signal receiving apparatus which is realized by software.

A case in which the function of the signal receiving apparatus according to the second embodiment shown in FIG. 6 is realized by software will be exemplified. In the configuration shown in FIG. 10, in a program storage memory 12, programs for realizing the function of a transformational despreading unit 101 shown in FIG. 6, a spread code generating unit 102, an FIR filter 103, and a filter coefficient updating unit 104 are stored. A CPU 11 executes processes according to the programs stored in the program storage memory 12.

A data storage memory 14 is a RAM in which data in an arithmetic operation by the CPU 11 and data of an arithmetic operation result are stored. A switch unit 13 sets a data path to any one of a path which inputs an input signal x in the data storage memory 14, a path on which data input/output is possible between the data storage memory 14 and the CPU 11, and a path which outputs the data stored in the data storage memory 14 as a symbol output S. A switching operation of the switch unit 13 is controlled by the CPU 11.

Figure 11:
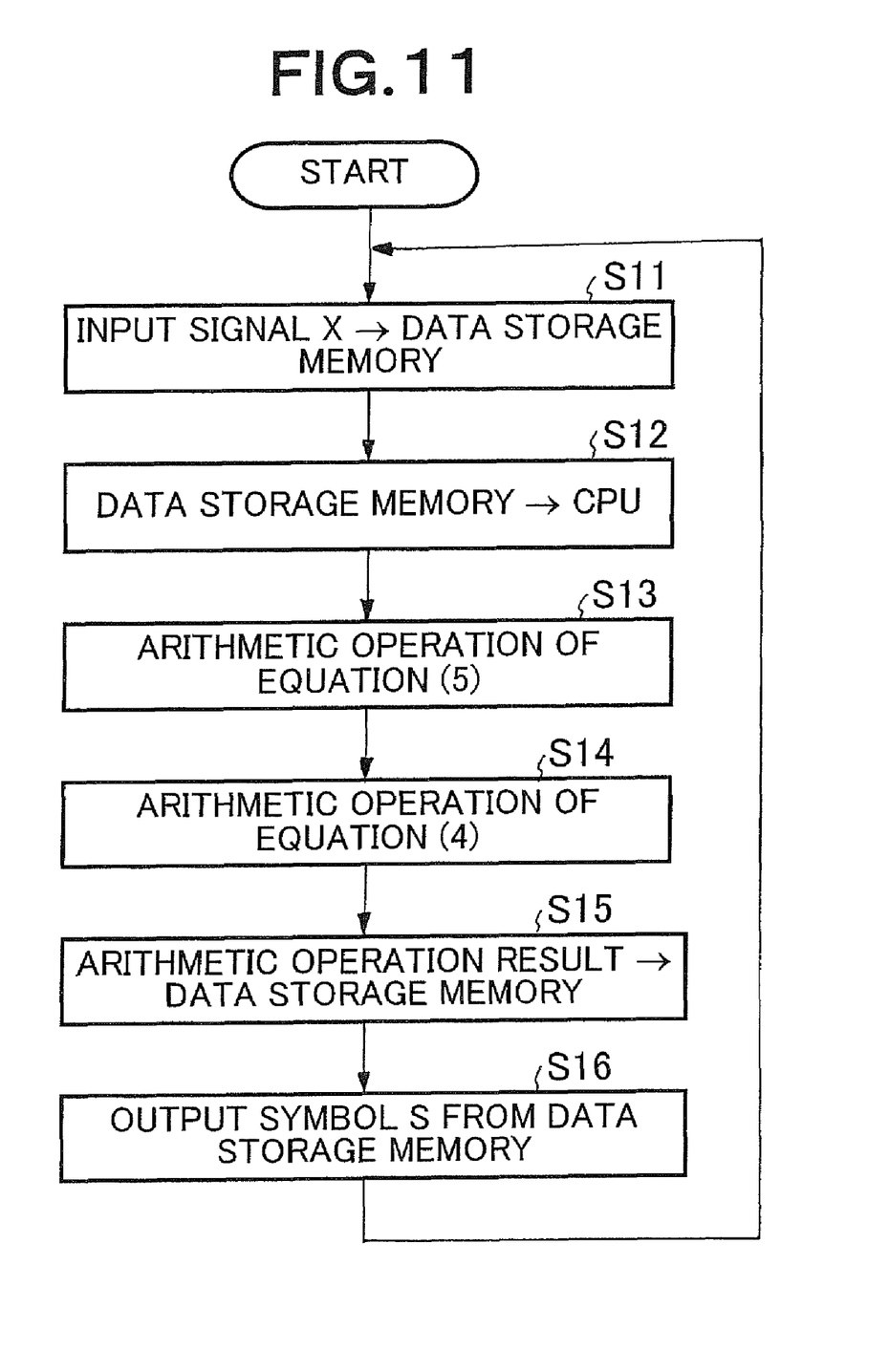
FIG. 11 is a flow chart showing an operation of the signal receiving apparatus.

An operation will be described below with reference to a flow chart in FIG. 11. The CPU 11 sets the switch unit 13 to input the input signal x in the data storage memory 14 and inputs the input signal x in the data storage memory 14 (step S11). The switch unit 13 is set such that the data stored in the data storage memory 14 is output to the CPU 11, and the data (in this case, input signals x) stored in the data storage memory 14 are sequentially input (step S12). The CPU 11 performs an arithmetic operation of Equation (5) (step S13). It is assumed that a spread code sequence c is specified in advance. The CPU 11 temporarily stores an arithmetic operation result z(k,n) in, for example, an internal register. When the capacity of the internal register is small, the arithmetic operation result may be temporarily stored in the data storage memory 14.

The CPU 11 performs an arithmetic operation of Equation (4) (step S14). The switch unit 13 is set such that data input/output is possible between the data storage memory 14 and the CPU 11, and an arithmetic operation result S(k) is stored in the data storage memory 14 (step S15).

Finally, the switch unit 13 is set such that the data stored in the data storage memory 14 can be output as the symbol output S, and S(k) stored in the data storage memory 14 is output as the symbol output S (step S16). The CPU 11 also executes a process of adaptively updating a filter coefficient w on the basis of the input signal x or the like. However, the process is omitted in FIG. 10.

The embodiment describes the example in which all the functions of the transformational despreading unit 101, the spread code generating unit 102, the FIR filter 103, and the filter coefficient updating unit 104 are realized by software. However, only some of the functions may be realized by software.

INDUSTRIAL APPLICABILITY

The present invention is preferably applied to a mobile wireless communication system using a spread spectrum technique, for example, a mobile wireless communication system using HSDPA.

What is claimed is:

1. A signal receiving apparatus which compensates for signal deterioration in a transmission path for transmitting an input signal which is spread-modulated, to reproduce signal data from the input signal, comprising:
   a filter coefficient updating unit which generates a filter coefficient on the basis of the input signal;
   a transformational despreading unit which performs a despreading process to the input signal; and
   an equalization filter which performs multiplication by using a despreading output from the transformational despreading unit and a filter coefficient output from the filter coefficient updating unit as inputs, and outputs a result which the multiplication results are added, as signal data,
   wherein the transformational despreading unit obtains a despreading output by addition and subtraction between the input signal and a spread code sequence.

2. The signal receiving apparatus according to claim 1, wherein
   the transformational despreading unit includes:
   a plurality of delay units which sequentially delay the input signal;
   a plurality of computing units each of which perform arithmetic operations using both of the input signal or an output from the delay unit and the spread code sequence; and an adder which adds arithmetic operation results of the plurality of computing units, and each of the plurality of computing units obtains an arithmetic operation result by addition and subtraction between the input signal or the output from the delay unit and the spread code sequence.

3. The signal receiving apparatus according to claim 1, wherein the equalization filter includes one multiplier which sequentially multiplies the filter coefficient output from the filter coefficient updating unit by the despreading output.

4. The signal receiving apparatus according to claim 1, characterized in that the transformational despreading unit performs an arithmetic operation of Equation (5), and the equalization filter performs an arithmetic operation of Equation (4).

[Numerical Expression 3]

$$S(k) = \sum_{m=0}^{M-1} c(M*k+m) * \left\{ \sum_{n=0}^{N-1} w(n) * x(M*k+m-n) \right\} \quad (4)$$

$$= \sum_{n=0}^{N-1} w(n) * \left\{ \sum_{m=0}^{M-1} c(M*k+m) * x(M*k+m-n) \right\}$$

$$= \sum_{n=0}^{N-1} w(n) * z(k, n)$$

[Numerical Expression 4]

$$z(k, n) = \sum_{m=0}^{M-1} c(M*k+m) * x(M*k+m-n). \quad (5)$$

5. The signal receiving apparatus according to claim 1, wherein the signal data is reproduced from the input signal spread-modulated in a mobile wireless communication system using HSDPA.

6. A terminal apparatus characterized in that the signal receiving apparatus according to claim 1 is mounted.

7. A signal receiving method which compensates for signal deterioration in a transmission path for transmitting an input signal which is spread-modulated, to reproduce signal data from the input signal, comprising:

generating a filter coefficient on the basis of the input signal;

performing a despreading process to the input signal to generate a despreading output;

performing multiplication by using the despreading output and the filter coefficient as inputs, and outputting a result which the multiplication results are added, as signal data; and wherein the despreading output is obtained by addition and subtraction between the input signal and a spread code sequence when the despreading output is generated.

8. The signal receiving method according to claim 7, wherein when the despreading output is generated, the input signal is sequentially delayed, each of arithmetic operation results is obtained by addition and subtraction between both of the input signal or the delayed input signal and the spread code sequence, and the arithmetic operation results are added to each other.

9. The signal receiving method according to claim 7, wherein one multiplier sequentially multiplies the filter coefficient output by the despreading output.

10. A signal receiving program embodied on a signal receiving apparatus which compensates for signal deterioration in a transmission path for transmitting an input signal which is spread-modulated, to reproduce signal data from the input signal, the signal receiving program causing a computer to execute:

a filter coefficient updating process of generating a filter coefficient on the basis of the input signal;

a transformational despreading process of obtaining a despreading output by addition and subtraction between the input signal and a spread code sequence; and an equalization filter process of performing multiplication between the despreading output and the filter coefficient and outputting a result which the multiplication results are added, as signal data.

* * * * *